US012802288B2

(12) United States Patent
Yucel et al.

(10) Patent No.: US 12,802,288 B2
(45) Date of Patent: Nov. 17, 2026

(54) METHOD AND APPARATUS FOR GENERATING AN IMAGE

(71) Applicant: SAMSUNG ELECTRONICS CO., LTD., Suwon-si (KR)

(72) Inventors: Mehmet Kerim Yucel, Chertsey (GB); Albert Saa-Garriga, Chertsey (GB); Bruno Manganelli, Chertsey (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 191 days.

(21) Appl. No.: 18/747,021

(22) Filed: Jun. 18, 2024

(65) Prior Publication Data

US 2024/0420398 A1 Dec. 19, 2024

Related U.S. Application Data

(63) Continuation of application No. PCT/KR2024/004429, filed on Apr. 4, 2024.

(30) Foreign Application Priority Data

Jun. 19, 2023 (GB) ...................................... 2309187

(51) Int. Cl.
*G06T 7/70* (2017.01)
*G06T 11/00* (2006.01)
*G06T 11/60* (2006.01)

(52) U.S. Cl.
CPC ................ *G06T 11/00* (2013.01); *G06T 7/70* (2017.01); *G06T 11/60* (2013.01); *G06T 2207/30168* (2013.01); *G06T 2207/30244* (2013.01)

(58) Field of Classification Search
CPC . G06T 2207/30244; G06T 2207/20084; G06T 2207/20081; G06T 11/60;
(Continued)

(56) References Cited

U.S. PATENT DOCUMENTS 10,339,689 B2 7/2019 Miao et al.
10,489,688 B2 11/2019 Shen et al.
(Continued)

FOREIGN PATENT DOCUMENTS

CN 103218619 A 7/2013
CN 106202362 A 12/2016
(Continued)

OTHER PUBLICATIONS

Daniel Vera Nieto et al., "Understanding Aesthetics with Language: A Photo Critique Dataset for Aesthetic Assessment", 36th Conference on Neural Information Processing Systems (NeurIPS 2022) Track on Datasets and Benchmarks, arXiv:2206.08614v3 [cs.CV], Sep. 21, 2022, 30 pages.
(Continued)

*Primary Examiner* — Hau H Nguyen
(74) *Attorney, Agent, or Firm* — Sughrue Mion, PLLC

(57) ABSTRACT

According to an embodiment of the disclosure, a method performed by an apparatus may include obtaining a plurality of images, each of the plurality of images comprising a view of a scene. The method may include computing respective scores for each of the plurality of images. The method may include estimating respective camera poses of each of the plurality of images. The method may include using the computed scores and the estimated camera poses to determine a new camera pose useable for generating a new image comprising a view of the scene and having a score greater than a first threshold score. The method may include generating the new image using the new camera pose.

19 Claims, 8 Drawing Sheets

(58) Field of Classification Search
CPC ... G06T 7/70; G06T 2207/30168; G06T 7/60; G06T 2207/20016; G06T 7/80; G06T 7/97; G06T 7/55
See application file for complete search history.

(56) References Cited

U.S. PATENT DOCUMENTS

| | | | |
|---|---|---|---|
| 11,290,640 B2 | 3/2022 | Lee et al. | |
| 11,599,739 B2 | 3/2023 | Hayashi et al. | |
| 11,886,499 B2 | 1/2024 | Son et al. | |
| 2013/0188866 A1 | 7/2013 | Obrador et al. | |
| 2016/0127724 A1* | 5/2016 | Sharma | H04N 5/907 348/231.3 |
| 2016/0140157 A1 | 5/2016 | Li et al. | |
| 2020/0267313 A1 | 8/2020 | Youn et al. | |
| 2021/0003684 A1* | 1/2021 | Gong | G01S 17/86 |
| 2022/0156886 A1 | 5/2022 | Petrangeli et al. | |
| 2022/0301252 A1 | 9/2022 | Wang et al. | |
| 2022/0358712 A1 | 11/2022 | Woo et al. | |
| 2022/0398705 A1 | 12/2022 | Martin Brualla et al. | |
| 2023/0052645 A1 | 2/2023 | Keller et al. | |

FOREIGN PATENT DOCUMENTS

| | | | |
|---|---|---|---|
| CN | 107018330 | A | 8/2017 |
| CN | 107862681 | A | 3/2018 |
| CN | 111242216 | A | 6/2020 |
| CN | 111369124 | A | 7/2020 |
| CN | 111757012 | A | 10/2020 |
| CN | 112116669 | A | 12/2020 |
| CN | 112183645 | A | 1/2021 |
| CN | 112767538 | A | 5/2021 |
| CN | 113033693 | A | 6/2021 |
| CN | 113139073 | A | 7/2021 |
| CN | 113643400 | A | 11/2021 |
| CN | 113657380 | A | 11/2021 |
| CN | 114140694 | A | 3/2022 |
| CN | 114170187 | A | 3/2022 |
| CN | 114898424 | A | 8/2022 |
| CN | 115100360 | A | 9/2022 |
| CN | 116258817 | A | 6/2023 |
| JP | 2002-063589 | A | 2/2002 |
| JP | 2023-019727 | A | 2/2023 |
| KR | 10-2019-0114340 | A | 10/2019 |
| KR | 10-2074406 | B1 | 2/2020 |
| KR | 10-2020-0062827 | A | 6/2020 |
| KR | 10-2021-0153502 | A | 12/2021 |
| KR | 10-2022-005255 | A | 1/2022 |
| KR | 10-2361894 | B1 | 2/2022 |
| WO | 2016/009421 | A1 | 1/2016 |
| WO | 2018/154092 | A1 | 8/2018 |
| WO | 2020/059263 | A1 | 3/2020 |
| WO | 2020/105144 | A1 | 5/2020 |
| WO | 2022/104178 | A1 | 5/2022 |
| WO | 2022/104299 | A1 | 5/2022 |
| WO | 2022/198686 | A1 | 9/2022 |
| WO | 2022/216309 | A1 | 10/2022 |
| WO | 2022/216333 | A1 | 10/2022 |

OTHER PUBLICATIONS

Bo Zhang et al., "Image composition assessment with saliency-augmented multipattern pooling", MoE Key Lab of Artificial Intelligence, arXiv:2104.03133v2 [cs.CV], Oct. 18, 2021, 28 pages.

Dong Liu et al., "Composition-aware image aesthetics assessment. ", arXiv:1907.10801v1 [cs.CV], Jul. 25, 2019, 10 pages.

Shuai He et al., "Rethinking Image Aesthetics Assessment: Models, Datasets and Benchmarks", Proceeding of the Thirty-First International Joint Conference on Artificial Intelligence (IJCAI-22), Jul. 2022, 7 pages.

Dan Zafra, "Photography Composition—Best Composition Rules in Photography ", Nov. 21, 2020, 30 pages, https://capturetheatlas.com/photography-composition/.

Ben Mildenhall et al., "NeRF: Representing Scenes as Neural Radiance Fields for View Synthesis", arXiv:2003.08934v2 [cs.CV], Aug. 3, 2020, 25 pages, https://www.matthewtancik.com/nerf.

Christian Reiser et al., "KiloNeRF: Speeding up Neural Radiance Fields with Thousands of Tiny MLPs", Max Planck Institute for Intelligent Systems, ETH Zurich and University of Tübingen, ICCV, 2021, 4 pages, https://creiser.github.io/kilonerf/.

Keunhong Park et al., "Nerfies: Deformable Neural Radiance Fields", arXiv:2011.12948v5 [cs.CV], Sep. 10, 2021, 18 pages, https://nerfies.github.io/.

International Search Report and Written Opinion issued Jul. 12, 2024 by the International Searching Authority in International Patent Application No. PCT/KR2024/004429. (PCT/ISA/220, PCT/ISA/210 and PCT/ISA/237).

Communication dated Dec. 17, 2025, issued by the European Patent Office in counterpart European Application No. 24826085.3.

Snavely et al: "Finding paths through the world's photos", ACM Transactions on Graphics, ACM, NY, US, vol. 27, No. 3, Article 15, Aug. 2008, pp. 1-11 (total 12 pages), XP058355324, DOI 10.1145/1360612.1360614.

* cited by examiner

METHOD AND APPARATUS FOR GENERATING AN IMAGE

CROSS REFERENCE TO RELATED APPLICATION(S)

The present application is a bypass continuation application of PCT/KR2024/004429 filed on Apr. 4, 2024 and claims benefit of priority to UK Patent Application No. 2309187.9 filed on Jun. 19, 2023. The content of the above applications is hereby incorporated by reference.

TECHNICAL FIELD

The present application relates to image processing, and in particular to generating a new image of a scene.

BACKGROUND

Many image processing techniques are known. One example is image suggestion where an image is output to a user based on it having a particular desired characteristic, such as low noise level, low blurring or some other quality. An image is typically selected based on a score that is computed to represent the extent to which an image meets the desired characteristic. Whilst such known techniques can be useful in terms of automatically outputting an image in a time-saving manner, they are only able to select an image from amongst a set of prestored images. This can be problematic if the score of even the best image is relatively low or the selected image is unsuitable.

Further, such conventional methods consume a lot of memory and use large models to select the image. Thus, they are unsuitable and cannot run in real-time on constrained-resource devices, including mobile devices.

SUMMARY

According to an embodiment of the disclosure, a method performed by an apparatus may include obtaining a plurality of images, each of the plurality of images comprising a first view of a scene. According to an embodiment of the disclosure, a method performed by an apparatus may include computing respective scores for each of the plurality of images. According to an embodiment of the disclosure, a method performed by an apparatus may include estimating respective camera poses of each of the plurality of images. According to an embodiment of the disclosure, a method performed by an apparatus may include using the computed scores and the estimated camera poses to determine a new camera pose useable for generating a new image comprising a second view of the scene and having a score greater than a first threshold score. According to an embodiment of the disclosure, a method performed by an apparatus may include generating the new image using the new camera pose.

According to an embodiment of the disclosure, an electronic apparatus comprising a memory, and at least one processor is provided. According to an embodiment of the disclosure, at least one processor is configured to obtain a plurality of images, each of the plurality of images comprising a first view of a scene. According to an embodiment of the disclosure, at least one processor is configured to compute respective scores for each of the plurality of images. According to an embodiment of the disclosure, at least one processor is configured to estimate respective camera poses of each of the plurality of images. According to an embodiment of the disclosure, at least one processor is configured to use the computed scores and the estimated camera poses to determine a new camera pose useable for generating a new image comprising a second view of the scene and having a score greater than a first threshold score. According to an embodiment of the disclosure, at least one processor is configured to generate the new image using the new camera pose.

According to an embodiment of the disclosure, a non-transitory computer-readable storage medium storing instructions is provided. According to the embodiment of the disclosure, the instructions may be executed by at least one processor, cause the at least one processor to obtain a plurality of images, each of the plurality of images comprising a first view of a scene. According to the embodiment of the disclosure, the instructions may be executed by at least one processor, cause the at least one processor to compute respective scores for each of the plurality of images. According to the embodiment of the disclosure, the instructions may be executed by at least one processor, cause the at least one processor to estimate respective camera poses of each of the plurality of images. According to the embodiment of the disclosure, the instructions may be executed by at least one processor, cause the at least one processor to use the computed scores and the estimated camera poses to determine a new camera pose useable for generating a new image comprising a second view of the scene and having a score greater than a first threshold score. According to the embodiment of the disclosure, the instructions may be executed by at least one processor, cause the at least one processor to generate the new image using the new camera pose.

BRIEF DESCRIPTION OF THE DRAWINGS

Implementations of the present techniques will now be described, by way of example only, with reference to the accompanying drawings, in which.

DETAILED DESCRIPTION

Figure 1:
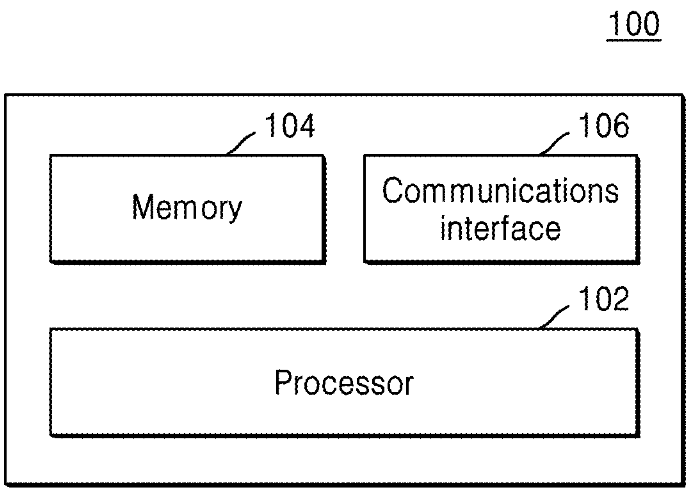
FIG. 1 is a block diagram of a computing device configurable to execute embodiments.

Embodiments can address one or more of the technical problems discussed above. Embodiments can provide an on-device, lightweight image assessment network that is compact enough for on-device operation. Embodiments can have the ability to generate a novel view of a scene with a desirable characteristic using, for example, neural radiance fields. Embodiments may use an efficient greedy algorithm that traverses the scene space by following the gradient of a score to quickly find a point in the scene space that generates the image with the best score.

According to a first aspect of the present invention, there is provided a computer-implemented image processing method comprising:

- obtaining a plurality of images, each of the plurality of images comprising a view of a scene;
- computing a respective score for each of the plurality of images;
- estimating a respective camera pose of each of the plurality of images;
- using the computed scores and the estimated camera poses to determine a new camera pose useable for generating a new image comprising a view of the scene and having a score greater than a first threshold score, and
- generating the new image using the new camera pose.

The computed scores may represent a property/characteristic of an image, such as a level of noise, blur or quality. The computed scores may be computed using a scoring model, e.g. a trained machine learning model. The machine learning model may be trained using the plurality of images and scores to output a score for an input comprising an image. The scoring model may provide a score representing image quality based on, for example, an extent to which the image complies with universal photograph composition rules.

The method may further comprise applying a pattern recognition process to the estimated camera poses and the computed scores to find a camera pose amongst the estimated camera poses associated with a high score amongst the computed scores. The pattern recognition process may also identify an initial adjustment manner to be used in a step of seeking a candidate new camera pose. The camera pose found to have the high score (e.g., the computed score greater than a second threshold score) may be selected as an initial camera pose for use in the step of seeking the new camera pose. If the computed scores are not greater than the second threshold score then a random camera pose may be selected as the initial camera pose for use in the step of seeking the new camera pose. The initial adjustment manner to be used in the step of seeking a candidate new camera pose may also be randomly selected in this case.

The method may further comprise rendering an image using the initial camera pose. The rendered image may have a lower resolution than a resolution of the plurality of images. The method may comprise computing a score for the low resolution image (typically using the scoring model), and determining whether the computed score of the low resolution image is (equal to or) greater than a first predetermined threshold. If the computed score of the low resolution image is (equal to or) greater than the first predetermined threshold then the method may comprise outputting the camera pose used to generate the low resolution image as the new camera pose. If the computed score of the low resolution image is not equal to or greater than the first predetermined threshold then the method may comprise seeking a candidate new camera pose.

The step of seeking the candidate new camera pose may comprise adjusting at least one component (e.g. x/y/z coordinate or rotation matrix) of the candidate new camera pose based on whether an image generated using the candidate new camera pose having the at least one component adjusted improves or deteriorates the score of the generated image compared to a score of an image generated using a (previous) camera pose without the at least one component adjusted.

The step of seeking the candidate new camera pose may comprise:

- adjusting a component of the candidate new camera pose at a current iteration of the method (including the step of seeking the candidate new camera pose) in a particular adjustment manner/action (e.g. increase or decrease; rotate clockwise or counter-clockwise) to produce a modified camera pose;
- generating an image (e.g., typically a low resolution image) based on the modified camera pose;
- computing a score for the image rendered based on the modified camera pose;
- determining whether the computed score is greater than a previous score computed for an image generated using a (previous or the initial) camera pose (having an un-adjusted component) during a previous iteration of the method;
- if the computed score is greater than (or equal to) the previous score then adjusting the (same) component of the camera pose in the (same) particular adjustment manner at a next iteration of the method, and
- if the computed score is not greater than (or equal to) the previous score then adjusting a different component of the camera pose in the particular adjustment manner at the next iteration, or adjusting the (same) component of the camera pose in a different adjustment manner at the next iteration.

The component may comprise: at least one of x-coordinate, y-coordinate or z-coordinate, or a rotation matrix of the camera pose. The adjustment manner may comprise at least one of increasing or decreasing a value of the component or another adjustment, such as adjusting the value to represent a clockwise or counter-clockwise rotation of the camera pose. The adjustment manner may be selected from a set. A particular adjustment manner may be excluded for selection from the set if the computed score is not greater than (or equal to) the previous score.

The method may comprise comparing the current iteration to an iteration threshold and if the current iteration is greater than (or equal to) the iteration threshold then outputting the modified camera pose as the new camera pose.

The camera poses may be estimated using a camera pose estimating model, e.g. a trained machine learning model. The machine learning model may be trained using a plurality of images with known camera poses, and comparing the plurality of images with images rendered using the model.

The step of generating the new image using the new camera pose may be performed using a machine learning model. The machine learning model may be trained using training data comprising camera poses and images to output an image rendered based on an input camera pose. The machine learning model may comprise a Neural Radiance Field (NeRF) model.

The method may further comprise:

- determining whether at least one of the computed scores is greater than a first score threshold, and
- if at least one of the computed scores is greater than the first score threshold then outputting the image of the plurality of images having the score greater than the first score threshold, and
- if at least one of the computed scores is not greater than the first score threshold then performing the step of estimating the respective camera pose of each of the plurality of images.

According to an aspect of the present invention there is provided an image processing (suggestion) method comprising:

obtaining a plurality of images, each of the plurality of images comprising a view of a scene;

computing a respective score for each of the plurality of images;

determining whether at least one of computed scores is greater than a threshold, and if at least one of the scores is not greater than the threshold then generating a new image comprising a view of the scene.

The new image may be generated using a method substantially as described herein to have a score greater than the threshold. Thus, some embodiments can provide an extended image suggestion system that can render novel views of a scene that represent an improvement over pre-stored/existing images of the scene. if at least one of the scores is greater than the threshold then the method may comprise outputting the image of the plurality of images having the score greater than the threshold.

According to a further aspect of the present invention there is provided an apparatus adapted to perform image processing, the apparatus comprising at least one processor configured to:

obtain a plurality of images, each of the plurality of images comprising a view of a scene;

obtain or compute a respective score for each of the plurality of images;

obtain or estimate a respective camera pose of each of the plurality of images;

use the computed scores and the estimated camera poses to obtain or seek a new camera pose useable for generating a new image comprising a view of the scene and having a score greater than a threshold, and obtain or generate the new image using the new camera pose.

According to an aspect of the present invention, there is provided a server configured to cooperate with a computing device substantially as described herein.

According to an aspect of the present invention, there is provided a computer-readable storage medium comprising instructions which, when executed by a processor, causes the processor to carry out any of the methods described herein.

FIG. 1 is a block diagram of a computing device 100 configurable to execute embodiments of the invention. The device will normally comprise, or be associated with, at least one processor 102, memory 104 and a communications interface 106. The at least one processor 102 may comprise one or more of: a microprocessor, a microcontroller and an integrated circuit. The memory 104 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example. The communications interface can provide data communication between the device and other devices/components, e.g. via a wireless internet connection, a cellular network connection, or the like. The computing device may further include a user interface component interface 108, such as a touchscreen. Other components and features of the device, such as a housing, power source/supply, display, audio output, etc, will be well-known to the skilled person and need not be described herein in detail.

In some embodiments the computing device 100 may comprise a constrained-resource device, but which has at least the minimum hardware capabilities required to use a trained neural network/ML model. The device may be: a smartphone, tablet, laptop, computer or computing device, virtual assistant device, a connected camera, etc. It will be understood that this is a non-exhaustive and non-limiting list of example devices.

Figure 2:
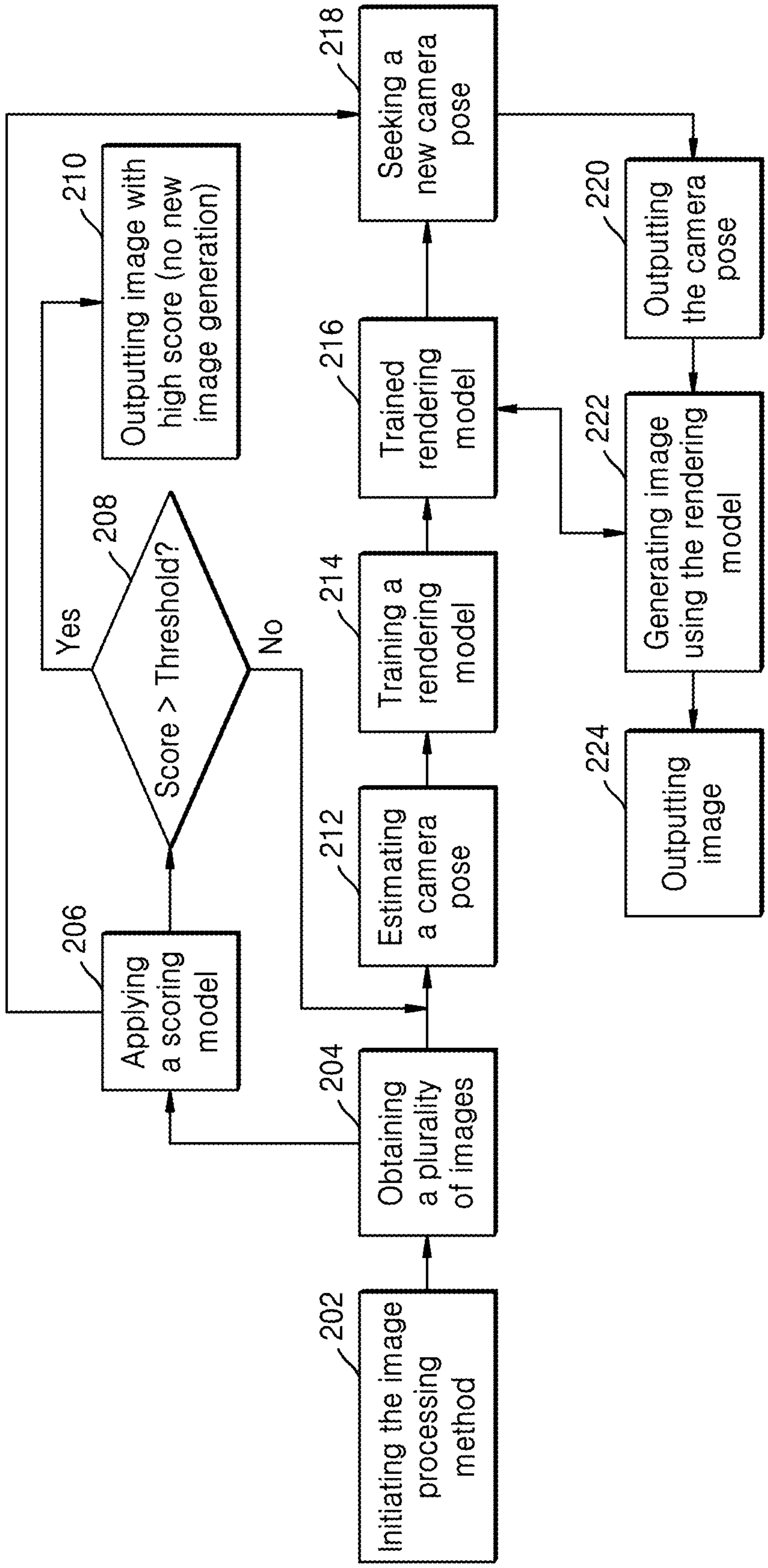
FIG. 2 is a flowchart showing example steps performed by an embodiment.

FIG. 2 is a schematic illustration of an example method according to an embodiment and shows steps performed by means of software instructions being executed by the computing device 100. However, in some embodiments one or more of the steps may be performed by a remote computing device, such as a server or a cloud service, that is in communication with the device 100. It will also be appreciated that at least one of the steps described herein may be re-ordered or omitted. One or more additional steps may be performed in some cases. Although the steps are shown as being performed in sequence in the Figures, in alternative embodiments some of them may be performed concurrently, possibly on different processors or cores. It will also be understood that embodiments can be implemented using any suitable software, programming language, data editors, etc, and may be represented/stored/processed using any suitable data structures and formats.

At step 202 the image processing method can be initiated. For example, the method may be initiated when an application, such as an image editor, executable by the computing device 100 is opened by a user, or when a particular option in an application is selected. In an embodiment, the user may be prompted by the application to capture several images of a scene, e.g. different views of the same scene from different angles and/or camera positions, using a still or video camera of the computing device. This can provide a plurality of images relating to the scene that are saved to the memory 104 and which can be obtained for processing at step 204.

In an embodiment, the method may obtain a plurality of images related to a scene at step 204 by retrieving them from a data store or a remote device that is in communication with the computing device 100, e.g. based on user selection of a thumbnail image of the scene. Each image will comprise a view (e.g. from a particular location, angle, etc) (e.g., a first view) of the same scene. In cases where the images comprise photographs they will typically have been taken during the same short time period, e.g. within a minute or so. It will be understood that the scene can have different contents: outdoor/indoor, single/multiple objects, etc. The plurality of images may comprise a photo collection or one or more video and may include any number of images, although more images/longer videos are can be advantageous. In an embodiment, the user may be instructed or guided towards providing images that are considered desirable for processing by the method, e.g. ones having diversity in viewing angles/camera poses amongst images, initially static video of the scene, images without moving objects, avoiding lighting changes, etc.

For example, a first view of a scene may include a view (e.g., at least one of from particular location, angle, range, or depth) of the scene. For example, a second view of a scene may include a new view of the scene that may differ from the first view.

At step 206 embodiments can assign a score to each of the obtained plurality of images. According to the embodiment of the disclosure, at step 206, the embodiment may apply a scoring model. The score will typically be in the form of a numerical (or alternative, e.g. grade A-F) value assigned to each image. The score will represent a qualitative and/or quantitative measure of a particular characteristic of, or related to, the image. For example, in an embodiment, the score will represent a level of noise (distortion) present in the images and the method may be intended to suggest/create a new image of the scene that has a lower noise level than any of the existing images. In cases such as these the scoring system may be such that a high (desirable) score corresponds to a low noise level.

The scoring of step 206 may use a scoring model. Ideally, the model will assess images independently of image aspect-ratio, image size or image theme (e.g. semantics) and will also offer fine granularity, e.g. ability to assess the characteristic in images that are similar to each other. In an embodiment, the model may comprise a machine learning (ML) model, such as a neural network. The ML model can be trained using training data comprising a set of images and a score associated with each of the images. For example, the training data may comprise images that have been scored by one or more human, e.g. who has assigned a score representing a feature of the image such as the level of noise/distortion present. In an embodiment, the model can use a MobileNetv2 backbone for feature extraction. This can be followed by two modules, where the first one may comprise an adaptive pooling operation to reduce the spatial size of the feature maps. The second module can comprise 3 linear layers, where ReLU activations are used in between these layers. The final output can comprise a single score. In an embodiment, the model may be trained with an ADAM optimizer using Stochastic Gradient Descent algorithm. This training updates the weights of the network using the training data as the ground-truth.

In an embodiment, the score can represent a level of blur present in the images and the method may be intended to suggest/create a new image of the scene having less blurring. In an embodiment, the score can represent a quality of the images and the method may be intended to suggest/create an image of the scene having higher quality. Quality may refer to technical considerations, such as resolution, in addition to aesthetic quality. In an embodiment, the score can represent an editing score for the images and the method may be intended to suggest/create an image with desired edits. Such editing tasks may require external models (e.g. image inpainting).

In an embodiment, the scoring may be based on a model that assigns images scores representing quality based on how well they comply with universal photo-composition rules. Such rules can result in a high score for images based on factors such as one or more of the following, for example, having a plain background, being based the rule of thirds, being based on the rule of odds, the presence of diagonal lines, depth of view, balance of elements, symmetry and/or natural framing, etc. Not only will images having a high score in this regard be more appealing visually but they also have features that can have technical benefits, e.g. improve results for image processes such as reverse image searches, object detection, zooming, improved resolution, etc. Thus, embodiments may be composition-based for generalization and are not limited to a particular user's aesthetic preferences like existing image suggestion techniques. In an embodiment, the scoring model may be based on a modification of the known composition-based SAMP technique, where certain parts of the technique may be changed and/or omitted. For example, embodiments may use a scoring model that may be modified compared to conventional SAMP in all or some of the following ways: saliency prediction is removed; attribute supervision is removed; a single pattern is used instead of several; single score prediction is used instead of predicting N number of scores, and/or training takes place using multiple datasets rather than only one. The scoring model can work significantly faster than conventional SAMP whilst providing comparable, or improved, results.

In an embodiment, the method can use non-ML methods for scoring, e.g. edge detection, background detection, etc, as well as symmetry detection methods and monocular depth cues. In an embodiment, edge detection methods can detect the lines for rule-of-thirds, for example. If detected edges are in line with the rule-of-thirds (which is a preset rule and so what is expected is known), the method can provide a higher score. Monocular depth cues provide information on the depth of the scene (per-pixel distance to the camera). The range of depth values can be helpful to find whether we have a depth-of-field effect in the image (i.e. little depth variance in an image can indicate no depth-of-field effect is present, resulting in a zero/low score). For background/symmetry detection, embodiments can leverage a saliency method that indicates the salient parts of the image. This can be used for object emphasis rule, as well as the symmetry rule, for example. Saliency methods produce a binary mask, where the salient object is presented in white, while the rest is presented in black. The score in this case may correspond to the size of the white area in the mask. Any of these, or other, outputs can be used to generate a numerical (or other) score, e.g. within a particular numerical range, to an image.

The first threshold score may include a threshold score to determine the camera pose, for example. According to an embodiment, the first threshold score may be predetermined.

At step 208 the method may perform a check as to whether any of the obtained images have a score that is greater than a first threshold score. The first threshold score may be predetermined/prestored by a developer of the application or may be set by a user. For example, if the score assigned at the step 206 can be between 0 and 5, the first threshold may be set as 3.35, which should result in an image with a higher than average score. In an embodiment, the first threshold score may be set as higher than a highest score amongst the scores assigned to the obtained plurality of images. If one or more image has a score greater than the first threshold then control may pass to step 210 where a high score image is output by the method. If there is more than one image with the same high score then one may be selected, e.g. at random, for output at the step 210. If an image having a score greater than the first threshold is not identified at the step 208 then control passes to step 212 so that a new image of the scene may be generated and output. Further, in an embodiment, even if an image having a score greater than the first threshold is present amongst the obtained plurality of images then the method may, in any case, offer the user an option to generate a new image of the scene that should have an even better score and pass control to step 212.

At step 212 the method can estimate the camera pose of each of the plurality of obtained images. This information can be used by the method for determining how to render a novel image of the scene. The camera pose information can be in any suitable form, e.g. x/y/z coordinates, rotation matrix, etc. The camera pose may correspond to the position of a device that was used to capture an image, e.g. photograph, or it may correspond to a location of a viewer/observer if the image was artificially generated. The step 212 can be performed using any suitable technique, preferably one that has desirable properties, such as fast execution time and accurate results. Examples of suitable techniques that can be used to implement the camera pose estimation include COLMAP library, OpenSFM, etc.

For example, the component of the camera pose may include at least one of x-coordinate, y-coordinate, z-coordinate, or rotation matrix.

At step 214 embodiments can obtain a rendering model 216 usable to render an image relating to the scene, e.g. a new view of the scene from a selected camera pose (e.g., viewer/observer position) that will be different to those of the existing images. According to the embodiment of the disclosure, at step 214, the rendering model 216 may be trained. The rendering model may comprise a ML model, such as a neural network. In typical embodiments the model may be based on a Neural Radiance Field (NeRF) network. This network can take as input a spatial location and viewing angle and can output the volume density and colour at that spatial location. To render an image comprising a view of the scene, rays are shot from each pixel and several sampled points along each ray are evaluated with the NeRF network. The colours along a ray are integrated to produce the final colour for each pixel. NeRF can significantly compress the amount of storage required for rendering.

The NeRF model may be initially trained using ground-truth images with known poses, and by comparing the ground-truth image with images rendered by the NeRF. The NeRF network may comprise a number of linear layers. The number can vary, but they are accompanied by ReLU activations throughout the network, except the final linear layer. In an embodiment, the network training can use ADAM optimizers with Stochastic Gradient Descent algorithm to update weights of the network. An embodiment may use any suitable NeRF technique, especially one that performs fast, consumes less memory and requires as few input images as possible because this will improve the overall performance/accuracy of the method and provide a better experience. A non-exhaustive list of suitable examples of suitable NeRF techniques includes: NeRF (see, for example, https://github.com/bmild/nerf), MobileNeRF (see, for example, https://mobile-nerf.github.io/), Plenoxels (see, for example, https://ar5iv.labs.arxiv.org/html/2112.05131) and MF-NeRF (see, for example, https://arxiv.org/pdf/2304.12587v3.pdf).

Once the model 216 is trained for a scene, embodiments can determine a new camera pose that is predicted to render an image comprising a view of the scene that will have a high score. The selected camera pose can be input into the trained model, which will render the image. The data used for the training can include the plurality of images obtained at the step 204 and the camera poses of each of these images estimated at the step 212. A goal of the training is to learn the representation of the scene with a neural network and the output will comprise a neural network representing the scene. Each different scene will require new training. The training can be performed by the computing device 100. Alternatively, the computing device can transfer the images and associated camera poses to a server, with the server performing the training. If the training is performed on a server then model weights will be returned to the computing device. In any case, the trained neural network will be relatively small in terms of data size and so can efficiently be stored on, and used by, the computing device and also makes server-client communication efficient, if used.

At step 218 embodiments can seek a new camera pose that is predicted will render a new image of the scene that can have a relatively high score, e.g. a score that may be higher than the best score amongst those of the obtained plurality of images and/or at least equal to a predetermined score first threshold.

Figure 3:
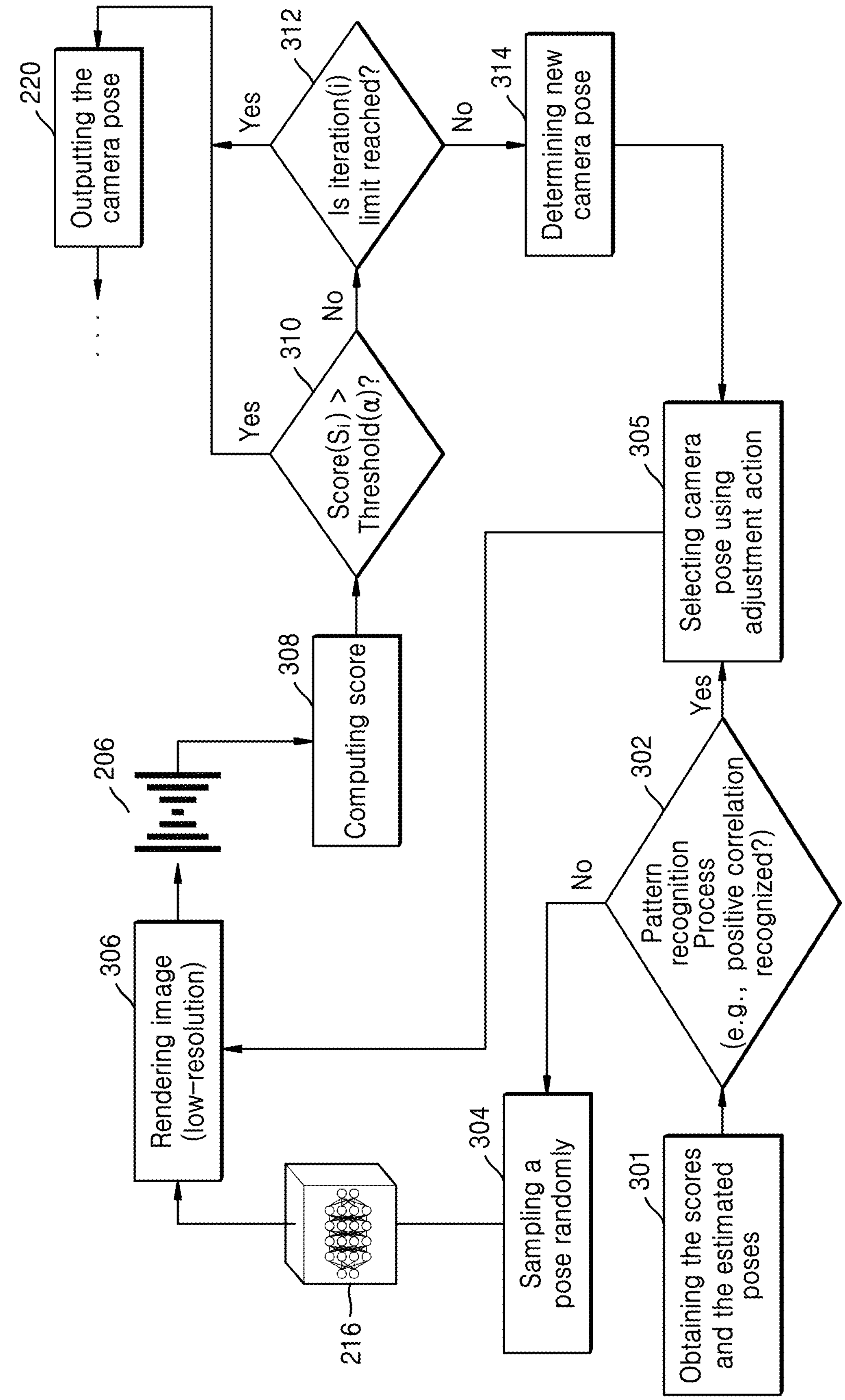
FIG. 3 is a flowchart showing example steps of a new camera pose seeking process used by the embodiment.

FIG. 3 is a flowchart showing example steps involved in this new camera pose seeking. More than one iteration of these steps may be performed by embodiments.

At step 301 embodiments can obtain the scores computed for the plurality of images at the step 206 and the camera poses of images estimated at the step 212. At step 302 embodiments can attempt to recognize a pattern that may exist in relation to the camera poses and their computed scores (e.g. "How do scores change with respect to camera pose components?", or "Is there a positive correlation recognized between obtained scores and the estimated poses?"). The existence of such a pattern can be used to determine an initial camera pose for the new camera pose seeking process 218. This can be done by leveraging the information that is already available, in particular the computed scores and the estimated camera poses of the images (which were also used for training the rendering model 216). The training images will often comprise user-taken images and so will reflect the camera movements of the user, which can help the process recognize the intention of the user. Embodiments can be guided by these movements/trajectory, thereby automatically following the user's intentions.

For example, the second threshold score may include a threshold score that determine the computed score is high score or not.

In more detail, embodiments can attempt to find a pattern between camera poses of the obtained images ($C_N$) and their scores ($S_N$). For example, image $I_N$ is taken from camera pose $C_N$, and has an aesthetic score of $S_N$. The image $I_N$ can be a user-taken or a computer-generated image in an embodiment. This is essentially a pattern recognition problem and so can be solved using any suitable pattern recognition algorithm. One suitable example is clustering, where camera poses and scores are clustered and matching clusters can reveal which camera pose component(s) result in high scores. Neural network-based solutions can also be used. For instance, an embodiment can use neural networks that find the prominent relationships between camera pose components and scores. Such a neural network can take as input N number of camera poses/scores. The network can consist of linear layers and can use ReLU activations. The number of layers (e.g. the depth of the network) can be adjusted with respect to hardware requirements. The network can output positive relations between camera pose components and scores, if there are any. The network can be trained with a standard ADAM optimizer, using training data comprising camera poses and related images, and Stochastic Gradient Descent algorithm to update the network weights. Data mining techniques can be used by alternative embodiments, e.g. frequent pattern discovery or K-optimal pattern discovery.

Embodiments can use a recognized pattern/trajectory to intelligently determine the first/initial camera pose to be used by the process 218. A pattern/trajectory is considered to be available if there is a correlation between the scores(S) and camera poses (C) of the images. The correlation can be positive or negative. For example, "Increasing x coordinate of camera pose improves score" is a positive correlation, whilst "Increasing x coordinate reduces score" is a negative correlation. Negative correlations are still meaningful as they show what should not be done during camera pose component adjustment/trajectory exploration. Positive correlations are useful and directly show what should be done during camera pose component adjustment/trajectory exploration in order to find a camera pose that will result in an increased score. Positive correlations are directly useful patterns/trajectories and are more informative in terms of indicating what to do in the next iteration of the pose sampling. On the other hand, negative correlations only cancel out a part of the search space and do not directly show what to do next.

Figure 4A:
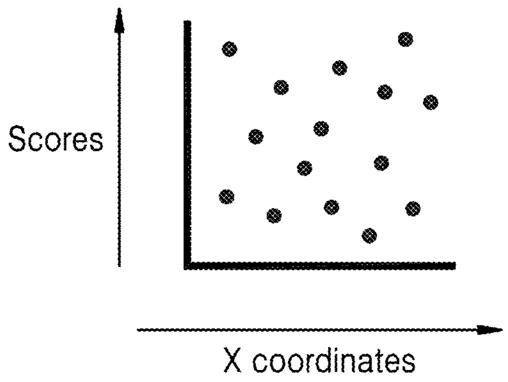
FIG. 4A is a diagram showing example of correlations between camera pose components and scores.
Figure 4B:
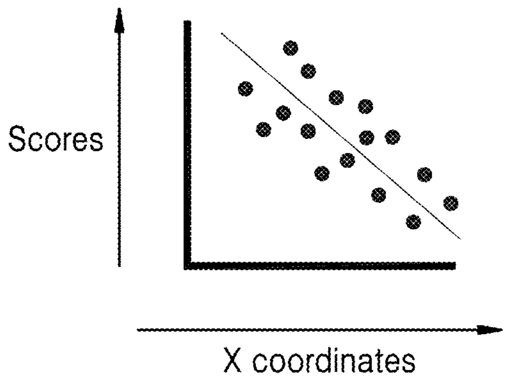
FIG. 4B is a diagram showing example of correlations between camera pose components and scores.
Figure 4C:
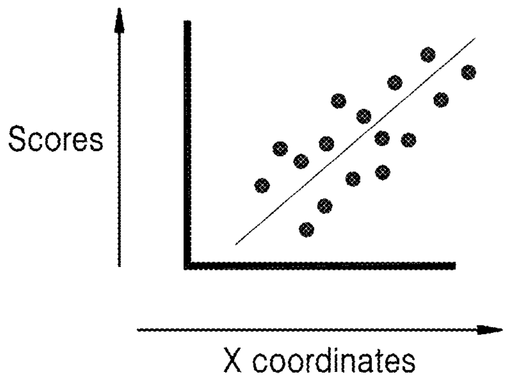
FIG. 4C is a diagram showing example of correlations between camera pose components and scores.

FIGS. 4A-4C are diagrams showing examples of correlations between camera pose components and scores. Every point in the plots represents an image and three scenarios are visualised in the FIGS. 4A-4C: no correlation available, negative correlation available and positive correlation available, respectively. The examples use X coordinates of camera poses, but it will be understood that other components of the camera pose, e.g. Y or Z coordinates, rotation matrix, etc, can be used. A recognized correlation can be used to determine a camera pose adjustment action that will be performed at the next step (either step 304 or 305 in FIG. 3).

In the example of FIG. 4A, there is no pattern/relation/correlation between X coordinates and the scores. Embodiments may assume that there is also no correlation between other components of camera poses and the scores. This means there is no correlation available and so the action to be performed at the next step (304) will be selecting a pose randomly.

In the example of FIG. 4B, there is a negative correlation between X coordinates and the scores, i.e. scores of images tend to decrease as the value of the X coordinate of their camera poses increases. Embodiments may assume that there is no correlation between other components of camera poses and the scores. This pattern indicates that there is a negative correlation and so the action to be performed at the next step (304) will be sampling a pose randomly, excluding increasing the X coordinate.

In the example of FIG. 4C, there is a positive correlation between X coordinates and the scores, e.g. scores of images tend to increase as the value of the X coordinate of their camera poses increases. Embodiments may assume that assumed there is no correlation between other components of camera poses and the scores. This pattern indicates there is a positive correlation and so the action to be performed at the next step (305) will be sampling a pose based on this correlation, e.g. by increasing the X coordinate.

Returning to FIG. 3, if no positive correlation is recognized (e.g. as per the examples of FIG. 4A or 4B) at the step 302 then control passes to step 304, where a random initial camera pose is selected (instead of one directly based on a recognized positive correlation). If a negative correlation was found at the step 302 then this random selection may exclude a selection based on that, e.g. the random selection may be rejected and re-executed if it corresponds to the negative correlation. For instance, based the example of FIG. 4B, the randomly-selected camera pose will be rejected if there is an increase in its X coordinate compared to the camera pose of the previous iteration. If the current iteration is the first time step 304 is being executed then the camera pose of the image amongst the obtained plurality of training images that had the highest computed score will be used for this comparison. In an embodiment, the random selection may be made from among a set of possible actions that can be applied successively. Typical examples of the actions include: increase X coordinate by a value x1; decrease X coordinate by x2; increase Y coordinate by y1; decrease Y coordinate by y2, and so on. Embodiments can select an action based the correlation found. For example, if increasing the value of the X coordinate was found to be a negative correlation then that is excluded from the set of actions for the random selection. This sampling can take one or many action, which itself can be randomized too. The random selection can also be limited by the range of the estimated camera poses of the obtained plurality of images, etc.

If a positive correlation is recognized (e.g. as per the example of FIG. 4C) at the step 302 then control passes to step 305. At the step 305 a camera pose is selected using an adjustment action based on the positive correlation. For example, if the positive correlation indicates that the X coordinate should be increased (e.g. as per the example of FIG. 4C) then the X coordinate of the camera pose of the previous iteration is increased to produce the selected camera pose. If the current iteration is the first time step 305 is being executed then X coordinate of the camera pose of the image amongst the obtained plurality of training images that had the highest computed score will be increased.

Following the step 304 or 305, control passes to step 306, where the rendering model 216 is used to render an image based on input comprising the selected camera pose. Here, the resolution of the rendered image will be lower than the resolution of the obtained plurality of images, e.g. up to 4-8 times lower to save time and resources. To give an example, the resolution of the obtained images may be 3088×1440 (i.e. Samsung S23 Ultra display resolution), while the low-resolution may be 772×360 (4 times smaller), although it will be understood that many variations are possible.

At step 308 embodiments can compute a score for the lower resolution image rendered at the step 306. The score will normally be computed using the same scoring model as used at the step 206.

At step 310 embodiments can determine whether the image score computed at the step 308 is greater than a first predetermined threshold. The first threshold may be predetermined by a developer or may be set by a user. For example, if the score assigned at the step 308 can be between 0 and 5 then the first threshold may be set as 3.35, which should provide an image with a sufficiently higher than average score. In an embodiment, the first threshold may be set as higher than a highest score amongst the scores assigned to the obtained plurality of images. If the computed score is greater than the first threshold then the image that will be rendered by the corresponding camera pose is considered to be sufficient and so control passes to step 220, where the currently selected camera pose (e.g. the one used to generate the most recent low resolution image at the step 306) is output. If the computed score is not greater than the first threshold then control passes to step 312.

At step 312 embodiments can determine whether the current iteration of the process 218 exceeds an iteration threshold (e.g. first iteration is 1 and the iteration threshold is 10). The threshold may be predetermined by a developer or may be set by a user, e.g. based on a desired execution time/duration and/or output image quality. If the iteration threshold has been reached then control passes to step 220, where the currently selected camera pose is output. The score of the resulting image will still normally exceed the highest score amongst the existing plurality of images. If the iteration threshold has not been reached then control passes to step 314.

Figure 5:
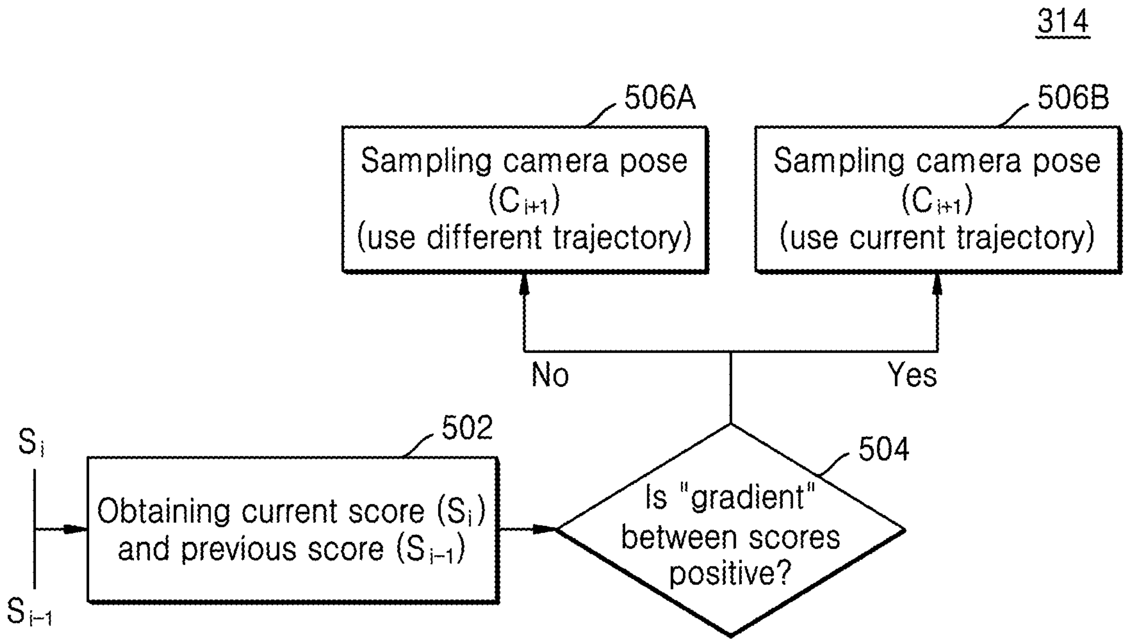
FIG. 5 is flowchart showing example camera pose component adjusting steps of the new camera pose seeking process, and FIG. 6 includes graphs comparing performance of an embodiment of the new camera pose seeking process and a brute-force alternative.

At step 314 embodiments can seek to determine a new camera pose that has a high probability of rendering an image having a score higher than the score of the image rendered using the currently selected camera pose. FIG. 5 is a flowchart showing example steps involved in this process.

At step 502, the score (e.g., "current score") of the image rendered using the currently selected camera pose and the score (e.g., "previous score") of the image rendered using the camera pose selected at the previous iteration of the process 218 are obtained. If the current iteration is the initial/first time step 502 is being executed then the previous score will comprise the image amongst the obtained plurality of training images that had the highest computed score.

At step 504, the obtained current score and the previous score are compared. The result of this comparison will be used to determine the camera pose adjustment action that will be taken at the next iteration of the step 305 (which follows the step 314). Examples of camera pose adjustment actions include increasing or decreasing the value of the component by 1 or some other number. The different component/adjustment action may be selected at random, e.g. from a set of possible permitted actions (in a similar manner to the step 304 described above), or may be selected based on selection history, etc. In an embodiment, the comparison may comprise finding the difference (e.g., "gradient") between the current score and the previous score. In an embodiment, more complex formulations may be used instead of finding the difference. For example, embodiments may store "history" type information of what happened at each iteration of the exploration to take into account the bigger picture. This can provide a memory bank that allows embodiments to "tolerate" moving in a direction/selecting an adjustment action that failed in the (one or more) immediately previous iteration, but was mostly positive in a longer consideration of previous iterations, e.g. over the last 15 iterations.

If the result of the comparison of the step 504 indicates the current score is greater than the previous score (e.g., a "positive gradient") then the camera pose adjustment action (e.g., "trajectory") that resulted in the current score/camera pose will be continued (step 506B) at the next iteration of the step 305. That is, the same component of the camera pose will be adjusted in the same adjustment manner at the next iteration of the step 305. For instance, if the current camera pose was selected based on positive correlation/action of "increasing X coordinate increases score" then the X coordinate of the camera pose will be increased again at the next execution of the step 305.

For example, the camera pose adjustment manner may include the way camera pose adjustment action.

If the result of the comparison of the step 502 indicates the current score is not greater than (or merely equal to) the previous score then a different camera pose adjustment action will be used (step 506A) at the next iteration of the step 305. That is, a different component of the camera pose will be adjusted (in the same adjustment manner) at the next iteration of the step 305, or the same component will be adjusted in a different adjustment manner. For instance, if the current camera pose was selected based on the correlation/action of "increasing X coordinate increases score" then at the next execution of the step 305 the X coordinate may be decreased, or a component other than the X coordinate, e.g. the Y or Z coordinate, may be increased.

Process 314 is quite similar to the pattern recognition problem of process 302, although here the gradient is the change in scores between images rendered using the current and previous camera poses. In each iteration, embodiments can check the gradient and take one of two actions. If the gradient improves the score (e.g., positive gradient) then continue with that trajectory. If gradient does not improve the score (e.g., negative gradient) then continue using a random trajectory that is not the same as the previous trajectory. The approach can efficiently find the camera pose that can significantly increase or maximize the score. Embodiments are likely to surpass the score threshold within a given iteration limit and are also more likely to output an image having the "best possible" score if/when the iteration limit is reached. Further, the low-resolution images rendered at step 306 do not need to be saved long-term and only the camera pose of the final iteration is output.

Figure 6:
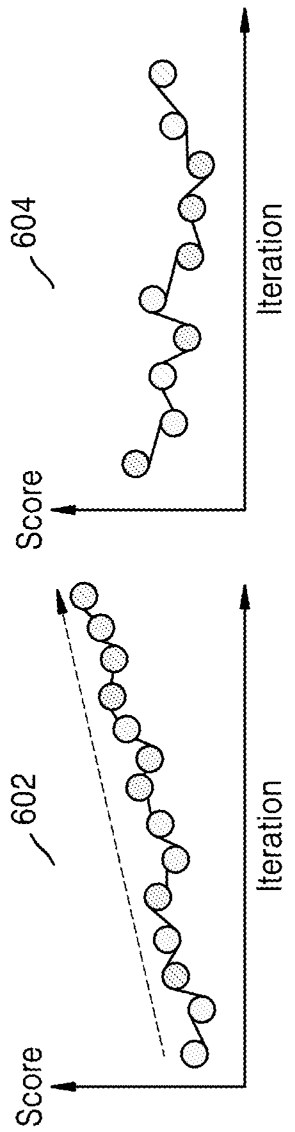

FIG. 6 includes a first graph 602 that illustrates computed scores of the images rendered by iterations of the step 306 of the new camera pose seeking process 218 along its x-axis, with the y-axis representing the iterations. As can be seen, the scores generally improve over time, meaning that the score of the image rendered using the camera pose selected at the final iteration has a high probability of being a high score, e.g. that exceeds the threshold.

To contrast, graph 604 illustrates computed scores of images generated using a naive, brute-force approach. This approach randomly samples a pose in the scene and renders a full-resolution image using that pose. The score of the rendered image is computed and the rendered image and its score are saved in a database. This process is repeated until an iteration limit is reached, or an image is rendered with a score above a threshold. However, there are problems with this approach. In particular, it is costly to render a full-resolution image each time. There is also no guarantee that the threshold will be reached. The complete randomness of the process means that performance is unstable and it does not exploit already-computed scores and so is inefficient. Further, there is a need to save all intermediate images, which requires additional storage.

In comparison, embodiments can leverage the computed scores of the training images and so are more efficient, and also render temporary images during processing in low-resolution to save time and computation. Embodiments can also follow the clues in pose sampling and so are stable and are also practically guaranteed to produce the best image in terms of scoring. Embodiments also avoid the need to save intermediate images and so have low storage requirements.

Returning to FIG. 2, after the selected camera pose is output at step 220, it is used to generate an image at step 222. This will typically be done using the trained rendering model 216. The resulting image 224 can be displayed to the user on the computing device 100 and/or stored and/or transferred to another device. The rendered image may be used/processed in any suitable manner, e.g. to provide a suggestion to the user that they should share their best scored images on social media; guide the user while taking photos, thereby reducing the photography expertise required to produce good quality images; use the image for an image-based search or object recognition process, etc.

An embodiment can provide an intelligent photography assistant that guides the user to improve photos in real-time. Embodiments can also be used to power other use cases, such as image animation and lifting video/image editing capabilities to 3D for further fidelity. The optimization-based approach for scene exploration can be implemented with different algorithms (not just the new camera pose seeking process described herein), which can help tailor performance for different hardware. An embodiment may use more complex exploration, such as using a completely separate neural network (NN) to determine how to produce the trajectory instead of following the gradient.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

According to an embodiment of the disclosure, the computed scores may be computed using a scoring model comprising a trained machine learning model. According to an embodiment of the disclosure, the computed scores may represent a characteristic of an image.

According to an embodiment of the disclosure, the computed scores may represent the characteristic comprising a level of noise of an image. According to an embodiment of the disclosure, the computed scores may represent a level of blurring of the image. According to an embodiment of the disclosure, the computed scores may represent a quality of the image based on an extent to which the image complies with universal photograph composition rules.

According to an embodiment of the disclosure, a method performed by an apparatus may include applying a pattern recognition process to the estimated camera poses and the computed scores to find a camera pose amongst the estimated camera poses associated with the computed score greater than the second threshold score. According to an embodiment of the disclosure, a method performed by an apparatus may include selecting the camera pose found to have the computed score greater than the second threshold score as an initial camera pose for use in the determining the new camera pose. According to an embodiment of the disclosure, if the computed scores are not greater than the second threshold score, a method performed by an apparatus may include selecting a random camera pose as the initial camera pose for use in the determining the new camera pose.

According to an embodiment of the disclosure, a method performed by an apparatus may include rendering an image using the initial camera pose, the rendered image having a resolution lower than a resolution of the obtained plurality of images. According to an embodiment of the disclosure, a method performed by an apparatus may include computing a score for the low resolution image using the scoring model. According to an embodiment of the disclosure, a method performed by an apparatus may include determining whether the computed score of the low resolution image is greater than the first threshold score. According to an embodiment of the disclosure, if the computed score of the low resolution image is greater than the first threshold score, a method performed by an apparatus may include outputting the camera pose used to generate the low resolution image as the new camera pose. According to an embodiment of the disclosure, if the computed score of the low resolution image is not greater than the first threshold score, a method performed by an apparatus may include seeking a candidate new camera pose.

According to an embodiment of the disclosure, a method performed by an apparatus may include adjusting a component of the candidate new camera pose based on whether an image generated using the candidate new camera pose having the component adjusted improves or deteriorates the score of the generated image compared to a score of an image generated using a camera pose not having the component adjusted.

According to an embodiment of the disclosure, a method performed by an apparatus may include adjusting the component of the candidate new camera pose at a current iteration of the method in a particular adjustment manner to produce a modified camera pose. According to an embodiment of the disclosure, a method performed by an apparatus may include generating an image based on the modified camera pose, the image generated based on the modified camera pose having a lower resolution than a resolution of the obtained plurality of images. According to an embodiment of the disclosure, a method performed by an apparatus may include computing a score for the image generated based on the modified camera pose. According to an embodiment of the disclosure, a method performed by an apparatus may include determining whether the computed score is greater than a previous score computed for an image generated using a previous camera pose during a previous iteration of the method. According to an embodiment of the disclosure, if the computed score is greater than the previous score, a method performed by an apparatus may include adjusting the component of the camera pose in the particular adjustment manner at a next iteration of the method. According to an embodiment of the disclosure, if the computed score is not greater than the previous score, a method performed by an apparatus may include adjusting a different component of the camera pose in the particular adjustment manner at the next iteration. According to an embodiment of the disclosure, if the computed score is not greater than the previous score, a method performed by an apparatus may include adjusting the component of the camera pose in a different adjustment manner at the next iteration.

According to an embodiment of the disclosure, the component of the camera pose may comprise an x-coordinate of the camera pose. According to an embodiment of the disclosure, the component of the camera pose may comprise y-coordinate of the camera pose. According to an embodiment of the disclosure, the component of the camera pose may comprise z-coordinate of the camera pose According to an embodiment of the disclosure, the component of the camera pose may comprise a rotation matrix of the camera pose. According to an embodiment of the disclosure, the adjustment manner may comprise increasing a value of the coordinate. According to an embodiment of the disclosure, the adjustment manner may comprise decreasing a value of the coordinate. According to an embodiment of the disclosure, the adjustment manner may comprise making a clockwise rotation of the rotation matrix. According to an embodiment of the disclosure, the adjustment manner may comprise making a counter-clockwise rotation of the rotation matrix.

According to an embodiment of the disclosure, the adjustment manner may be selected from a set. According to an embodiment of the disclosure, the adjustment manner may be excluded for selection from the set if the computed score is not greater than the previous score.

According to an embodiment of the disclosure, a method performed by an apparatus may include using the pattern recognition process to identify an initial adjustment manner to be used in the seeking the candidate new camera pose. According to an embodiment of the disclosure, the initial adjustment manner to be used in the seeking the candidate new camera pose may be randomly selected if the computed score having the score greater than the second threshold score is not identified.

According to an embodiment of the disclosure, a method performed by an apparatus may include comparing the current iteration to an iteration threshold. According to an embodiment of the disclosure, a method performed by an apparatus may include outputting the modified camera pose as the new camera pose if the current iteration is greater than the iteration threshold.

According to an embodiment of the disclosure, the generating the new image using the new camera pose may be performed using a machine learning model. According to an embodiment of the disclosure, the machine learning model may comprise a Neural Radiance Field (NeRF) model trained using training data comprising camera poses and images to output an image rendered based on an input camera pose.

According to an embodiment of the disclosure, a method performed by an apparatus may include determining whether at least one of the computed scores is greater than the first threshold score. According to an embodiment of the disclosure, a method performed by an apparatus may include outputting the image of the plurality of images having the computed score greater than the first threshold score if at least one of the computed scores is greater than the first threshold score. According to an embodiment of the disclosure, a method performed by an apparatus may include estimating the respective camera pose of each of the plurality of images if at least one of the computed scores is not greater than the first threshold score.

According to an embodiment of the disclosure, a computer-readable storage medium storing at least one instruction that, when executed, causes the at least one processor to perform corresponding to the method.

According to an embodiment of the disclosure, at least one processor is configured to use a scoring model comprising a trained machine learning model. According to an embodiment of the disclosure, the computed scores may represent a characteristic of an image.

According to an embodiment of the disclosure, at least one processor is configured to apply a pattern recognition process to the estimated camera poses and the computed scores to find a camera pose amongst the estimated camera poses associated with the computed score greater than the second threshold score. According to an embodiment of the disclosure, at least one processor is configured to select the camera pose found to have the computed score greater than the second threshold score as an initial camera pose for use in the determining the new camera pose. According to an embodiment of the disclosure, if the computed scores are not greater than the second threshold score, at least one processor is configured to select a random camera pose as the initial camera pose for use in the determining the new camera pose.

According to an embodiment of the disclosure, at least one processor is configured to render an image using the initial camera pose, the rendered image having a resolution lower than a resolution of the obtained plurality of images. According to an embodiment of the disclosure, at least one processor is configured to compute a score for the low resolution image using the scoring model. According to an embodiment of the disclosure, at least one processor is configured to determine whether the computed score of the low resolution image is greater than a first threshold score. According to an embodiment of the disclosure, if the computed score of the low resolution image is greater than the first threshold score, at least one processor is configured to output the camera pose used to generate the low resolution image as the new camera pose. According to an embodiment of the disclosure, if the computed score of the low resolution image is not greater than the first threshold score, at least one processor is configured to seek a candidate new camera pose.

According to an embodiment of the disclosure, at least one processor is configured to adjust a component of the candidate new camera pose based on whether an image generated using the candidate new camera pose having the component adjusted improves or deteriorates the score of the generated image compared to a score of an image generated using a camera pose not having the component adjusted.

According to an embodiment of the disclosure, at least one processor is configured to adjust the component of the candidate new camera pose at a current iteration of the method in a particular adjustment manner to produce a modified camera pose. According to an embodiment of the disclosure, at least one processor is configured to generate an image based on the modified camera pose, the image generated based on the modified camera pose having a lower resolution than a resolution of the obtained plurality of images. According to an embodiment of the disclosure, at least one processor is configured to compute a score for the image generated based on the modified camera pose. According to an embodiment of the disclosure, at least one processor is configured to determine whether the computed score is greater than a previous score computed for an image generated using a previous camera pose during a previous iteration of the method. According to an embodiment of the disclosure, if the computed score is greater than the previous score, at least one processor is configured to adjust the component of the camera pose in the particular adjustment manner at a next iteration of the method. According to an embodiment of the disclosure, if the computed score is not greater than the previous score, at least one processor is configured to adjust a different component of the camera pose in the particular adjustment manner at the next iteration. According to an embodiment of the disclosure, if the computed score is not greater than the previous score, at least one processor is configured to adjust the component of the camera pose in a different adjustment manner at the next iteration.

According to an embodiment of the disclosure, at least one processor is configured to use the pattern recognition process to identify an initial adjustment manner to be used in the seeking the candidate new camera pose. According to an embodiment of the disclosure, the initial adjustment manner to be used in the seeking the candidate new camera pose may be randomly selected if the computed score having the score greater than the second threshold score is not identified.

According to an embodiment of the disclosure, at least one processor is configured to compare the current iteration to an iteration threshold. According to an embodiment of the disclosure, at least one processor is configured to output the modified camera pose as the new camera pose if the current iteration is greater than the iteration threshold.

According to an embodiment of the disclosure, at least one processor is configured to determine whether at least one of the computed scores is greater than the first threshold score. According to an embodiment of the disclosure, if at least one of the computed scores is greater than the first threshold score, at least one processor is configured to output the image of the plurality of images having the computed score greater than the first threshold score. According to an embodiment of the disclosure, if at least one of the computed scores is not greater than the first threshold score, at least one processor is configured to estimate the respective camera pose of each of the plurality of images.

The features described herein in relation to any aspect may apply equally to another aspect and therefore, for the sake of conciseness, are not repeated.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

The processor may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

What is claimed is:

1. A computer-implemented image processing method comprising:
- obtaining a plurality of images, each of the plurality of images comprising a first view of a scene;
- computing respective scores for each of the plurality of images;
- estimating respective camera poses of each of the plurality of images;
- using the computed scores and the estimated camera poses to determine a new camera pose useable for generating a new image comprising a second view of the scene and having a score greater than a first threshold score, and
- generating the new image using the new camera pose,
- wherein the computed scores represent the characteristic comprising at least one of a level of noise of an image, a level of blurring of the image, or a quality of the image based on an extent to which the image complies with universal photograph composition rules.

2. The method according to claim 1, wherein the computed scores are computed using a scoring model comprising a trained machine learning model, and the computed scores represent a characteristic of an image.

3. The method according to claim 1, further comprising:
- applying a pattern recognition process to the estimated camera poses and the computed scores to find a camera pose amongst the estimated camera poses associated with the computed score greater than a second threshold score,
- selecting the camera pose found to have the computed score greater than the second threshold score as an initial camera pose for use in the determining the new camera pose, and
- if the computed scores are not greater than the second threshold score then selecting a random camera pose as the initial camera pose for use in the determining the new camera pose.

4. The method according to claim 3, further comprising:
- rendering an image using the initial camera pose, the rendered image having a resolution lower than a resolution of the obtained plurality of images;
- computing a score for the low resolution image using the scoring model;
- determining whether the computed score of the low resolution image is greater than the first threshold score;
- if the computed score of the low resolution image is greater than the first threshold score then outputting the camera pose used to generate the low resolution image as the new camera pose; and
- if the computed score of the low resolution image is not greater than the first threshold score then seeking a candidate new camera pose.

5. The method according to claim 4, wherein the seeking the candidate new camera pose comprises adjusting a component of the candidate new camera pose based on whether an image generated using the candidate new camera pose having the component adjusted improves or deteriorates the score of the generated image compared to a score of an image generated using a camera pose not having the component adjusted.

6. The method according to claim 4, wherein the seeking the candidate new camera pose comprises:
- adjusting a component of the candidate new camera pose at a current iteration of the method in a particular adjustment manner to produce a modified camera pose;
- generating an image based on the modified camera pose, the image generated based on the modified camera pose having a lower resolution than a resolution of the obtained plurality of images;
- computing a score for the image generated based on the modified camera pose;
- determining whether the computed score is greater than a previous score computed for an image generated using a previous camera pose during a previous iteration of the method;
- if the computed score is greater than the previous score then adjusting (506B) the component of the camera pose in the particular adjustment manner at a next iteration of the method, and
- if the computed score is not greater than the previous score then adjusting (506A) a different component of the camera pose in the particular adjustment manner at the next iteration, or adjusting the component of the camera pose in a different adjustment manner at the next iteration.

7. The method according to claim 6, wherein:
- the component of the camera pose comprises at least one of an x-coordinate, y-coordinate, z-coordinate of the camera pose, or a rotation matrix of the camera pose, and
- the adjustment manner comprises at least one of increasing or decreasing a value of the coordinate, or making a clockwise or counter-clockwise rotation of the rotation matrix.

8. The method according to claim 6, wherein the adjustment manner is selected from a set, and wherein the adjustment manner is excluded for selection from the set if the computed score is not greater than the previous score.

9. The method according to claim 6, further comprising:
- using the pattern recognition process to identify an initial adjustment manner to be used in the seeking the candidate new camera pose, and wherein the initial adjustment manner to be used in the seeking the candidate new camera pose is randomly selected if the computed score having the score greater than the second threshold score is not identified.

10. A method according to claim 6, further comprising:
- comparing the current iteration to an iteration threshold, and
- if the current iteration is greater than the iteration threshold then outputting the modified camera pose as the new camera pose.

11. The method according to claim 1, wherein the generating the new image using the new camera pose is performed using a machine learning model, wherein the machine learning model comprises a Neural Radiance Field, NeRF, model trained using training data comprising camera poses and images to output an image rendered based on an input camera pose.

12. The method according to claim 1, further comprising:
- determining whether at least one of the computed scores is greater than the first threshold score, if at least one of the computed scores is greater than the first threshold score then outputting the image of the plurality of images having the score greater than the first threshold score, and if at least one of the computed scores is not greater than the first threshold score then estimating the respective camera pose of each of the plurality of images.

13. A non-transitory computer-readable storage medium comprising instructions which, when executed by at least one processor, causes the at least one processor to carry a method according to claim 1.

14. An electronic apparatus, the apparatus comprising:

a memory configured to store instructions; and at least one processor configured to execute the instructions to:

obtain a plurality of images, each of the plurality of images comprising a first view of a scene;

compute respective scores for each of the plurality of images;

estimate respective camera poses of each of the plurality of images;

use the computed scores and the estimated camera poses to determine a new camera pose useable for generating a new image comprising a second view of the scene and having a score greater than a first threshold score, and generate the new image using the new camera pose, wherein the computed scores represent the characteristic comprising at least one of a level of noise of an image, a level of blurring of the image, or a quality of the image based on an extent to which the image complies with universal photograph composition rules.

15. The electronic apparatus according to claim 14, wherein the computed scores are computed using a scoring model comprising a trained machine learning model, and the computed scores represent a characteristic of an image.

16. The electronic apparatus according to claim 14, the at least one processor further configured to execute the instructions to:

apply a pattern recognition process to the estimated camera poses and the computed scores to find a camera pose amongst the estimated camera poses associated with a score greater than the second threshold score, select the camera pose found to have the score greater than the second threshold score as an initial camera pose for use in the determining the new camera pose, and if the computed scores are not greater than the second threshold score then select a random camera pose as the initial camera pose for use in the determining the new camera pose.

17. The electronic apparatus according to claim 14, the at least one processor further configured to execute the instructions to:

render an image using the initial camera pose, the rendered image having a resolution lower than a resolution of the obtained plurality of images;

compute a score for the low resolution image using the scoring model;

determine whether the computed score of the low resolution image is greater than a first predetermined threshold score;

if the computed score of the low resolution image is greater than the first predetermined threshold score then output the camera pose used to generate the low resolution image as the new camera pose; and if the computed score of the low resolution image is not greater than the first predetermined threshold score then seek a candidate new camera pose.

18. The electronic apparatus according to claim 14, the at least one processor further configured to execute the instructions to:

use a machine learning model, wherein the machine learning model comprises a Neural Radiance Field, NeRF, model trained using training data comprising camera poses and images to output an image rendered based on an input camera pose.

19. The electronic apparatus according to claim 14, the at least one processor further configured to execute the instructions to:

determine whether at least one of the computed scores is greater than the first threshold score, if at least one of the computed scores is greater than the first threshold score then output the image of the plurality of images having the score greater than the first threshold score, and if at least one of the computed scores is not greater than the first threshold score then estimate the respective camera pose of each of the plurality of images.

* * * * *